(12) United States Patent
Hu et al.

(10) Patent No.: US 12,537,792 B2
(45) Date of Patent: Jan. 27, 2026

(54) INTERFACE EXTENSION METHOD, APPARATUS, AND SYSTEM

(71) Applicant: Huawei Technologies Co., Ltd., Shenzhen (CN)

(72) Inventors: Jian Hu, Nanjing (CN); Yuefeng Wu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 989 days.

(21) Appl. No.: 17/695,506

(22) Filed: Mar. 15, 2022

(65) Prior Publication Data
US 2022/0209996 A1    Jun. 30, 2022

Related U.S. Application Data

(63) Continuation of application No. PCT/CN2020/115785, filed on Sep. 17, 2020.

(30) Foreign Application Priority Data
Sep. 17, 2019 (CN) .......................... 201910878294.0

(51) Int. Cl.
H04L 61/5007 (2022.01)
H04L 12/46 (2006.01)
(Continued)

(52) U.S. Cl.
CPC ...... *H04L 61/5007* (2022.05); *H04L 12/4641* (2013.01); *H04L 12/66* (2013.01);
(Continued)

(58) Field of Classification Search
CPC ............... H04L 61/5007; H04L 49/111; H04L 12/4641; H04L 12/66; H04L 69/321; H04L 2101/622; H04L 45/02
See application file for complete search history.

(56) References Cited

U.S. PATENT DOCUMENTS 9,591,601 B2 * 3/2017 Rinta-Aho ............ H04W 28/16
10,165,427 B1 * 12/2018 Mikelich ............ H04L 43/0823
(Continued)

FOREIGN PATENT DOCUMENTS

CN       1859112 A      11/2006
CN       2884710 Y       3/2007
(Continued)

*Primary Examiner* — Blake J Rubin
(74) *Attorney, Agent, or Firm* — Conley Rose, P.C.

(57) ABSTRACT

A gateway device receives interface information sent by an interface extension device, where an Ethernet interface of the interface extension device is connected to a target Ethernet interface of the gateway device, and the interface information includes an interface type and a media access control (MAC) address of a first non-Ethernet interface of the interface extension device. The gateway device creates a first virtual interface on the target Ethernet interface based on the interface information, where the first virtual interface corresponds to the first non-Ethernet interface, and an interface type of the first virtual interface is an Ethernet interface. The gateway device sends an interface creation success notification to the interface extension device. The gateway device may obtain data of the first non-Ethernet interface through the first virtual interface, thereby implementing interface extension of the gateway device.

20 Claims, 6 Drawing Sheets

(51) Int. Cl.
  *H04L 12/66* (2006.01)
  *H04L 49/111* (2022.01)
  *H04L 69/321* (2022.01)
  *H04L 45/02* (2022.01)
  *H04L 101/622* (2022.01)

(52) U.S. Cl.
  CPC .......... *H04L 49/111* (2022.05); *H04L 69/321* (2013.01); *H04L 45/02* (2013.01); *H04L 2101/622* (2022.05)

(56) References Cited

U.S. PATENT DOCUMENTS

| | | | |
|---|---|---|---|
| 2003/0097480 A1 | 5/2003 | Feuerstraeter et al. | |
| 2005/0180429 A1 | 8/2005 | Ghahremani et al. | |
| 2015/0244649 A1 | 8/2015 | Krakirian | |
| 2016/0128043 A1* | 5/2016 | Shuman | H04W 72/044 370/329 |
| 2016/0269284 A1 | 9/2016 | Cheng et al. | |
| 2017/0064042 A1* | 3/2017 | Vora | H04W 8/245 |
| 2017/0064045 A1* | 3/2017 | Pai | H04W 4/70 |
| 2017/0094033 A1* | 3/2017 | Sathyadevan | H04L 67/565 |
| 2017/0149614 A1* | 5/2017 | Zheng | H04L 45/021 |
| 2018/0052738 A1 | 2/2018 | Sajassi et al. | |
| 2018/0123828 A1 | 5/2018 | Zhang et al. | |
| 2018/0285302 A1 | 10/2018 | Oprea | |
| 2019/0068407 A1* | 2/2019 | Haga | H04L 69/08 |
| 2019/0239068 A1* | 8/2019 | Mudulodu | H04L 9/3226 |
| 2019/0386954 A1* | 12/2019 | Lau | H04L 61/2503 |
| 2020/0059976 A1* | 2/2020 | Bhatia | H04W 8/005 |
| 2020/0366737 A1* | 11/2020 | Florit | H04L 41/145 |
| 2022/0159092 A1* | 5/2022 | Raman | H04L 41/5054 |

FOREIGN PATENT DOCUMENTS

| | | |
|---|---|---|
| CN | 101552727 A | 10/2009 |
| CN | 104221343 A | 12/2014 |
| CN | 104283750 A | 1/2015 |
| CN | 104660508 A | 5/2015 |
| CN | 104869176 A | 8/2015 |
| CN | 105591988 A | 5/2016 |
| CN | 105706404 A | 6/2016 |
| CN | 105791214 A | 7/2016 |
| CN | 106209638 A | 12/2016 |
| CN | 106411740 A | 2/2017 |
| CN | 106533700 A | 3/2017 |
| CN | 107483366 A | 12/2017 |
| CN | 108199945 A | 6/2018 |
| WO | 2013147805 A1 | 10/2013 |
| WO | 2017173962 A1 | 10/2017 |

* cited by examiner

INTERFACE EXTENSION METHOD, APPARATUS, AND SYSTEM

CROSS-REFERENCE TO RELATED APPLICATIONS

This is a continuation of International Patent Application No. PCT/CN2020/115785 filed on Sep. 17, 2020, which claims priority to Chinese Patent Application No. 201910878294.0 filed on Sep. 17, 2019. The disclosures of the aforementioned applications are hereby incorporated by reference in their entireties.

TECHNICAL FIELD

This application relates to the field of communication technologies, and in particular, to an interface extension method, apparatus, and system.

BACKGROUND

The rapid development of network technologies enables information exchange and communication to be extended from people to people to things to things, and therefore a concept of Internet of things (IoT) emerges. Currently, an architecture of the IoT may be divided into a perception layer, a network layer, and an application layer. The sensing layer is where objects are identified and information is collected. The network layer is where information obtained at the perception layer is transferred and processed. The application layer is a layer at which users interact with the IoT, and is used to implement intelligent application of the IoT.

In the architecture of the IoT, a perception layer network and a network layer network (namely, a communication network) need to be connected through a gateway device. The gateway device generally includes one or more types of network interfaces, and each type of the network interfaces is connected to a perception layer network. For example, a gateway device with a power line communication (PLC) interface may implement interconnection between a PLC network and the communication network, and a gateway device with a radio frequency (RF) interface may implement interconnection between an RF network and the communication network.

However, because a network interface on each gateway device is fixed, different gateway devices need to be used for different perception layer networks to implement interconnection with the communication network. Consequently, the gateway device has poor generality.

SUMMARY

This application provides an interface extension method, apparatus, and system, to resolve a current problem of poor generality of a gateway device.

According to a first aspect, an interface extension method is provided. The method includes the following steps:

A gateway device receives interface information sent by an interface extension device, where an Ethernet interface of the interface extension device is connected to a target Ethernet interface of the gateway device, and the interface information includes an interface type and a media access control (MAC) address of a first non-Ethernet interface of the interface extension device; the gateway device creates a first virtual interface on the target Ethernet interface based on the interface information, where the first virtual interface corresponds to the first non-Ethernet interface, and an interface type of the first virtual interface is an Ethernet interface; and the gateway device sends an interface creation success notification to the interface extension device.

Optionally, the first non-Ethernet interface may be any non-Ethernet interface on the interface extension device, or the first non-Ethernet interface may be a non-Ethernet interface of the interface extension device connected to a perception layer network.

In this application, the target Ethernet interface of the gateway device is connected to the Ethernet interface of the interface extension device, so that the gateway device creates, on the target Ethernet interface, the first virtual interface corresponding to the first non-Ethernet interface of the interface extension device. The gateway device may obtain data of the first non-Ethernet interface on the interface extension device through the first virtual interface, that is, the first non-Ethernet interface on the interface extension device is equivalent to a remote physical interface of the first virtual interface on the gateway device. This implements interface extension of the gateway device, so that the gateway device can be connected to the perception layer network through the non-Ethernet interface on the interface extension device. In other words, the gateway device can be connected to different perception layer networks through the interface extension device provided that the gateway device includes an Ethernet interface. The gateway device has good generality.

Optionally, that the first virtual interface corresponds to the first non-Ethernet interface includes: A MAC address of the first virtual interface is the same as the MAC address of the first non-Ethernet interface.

In this application, because the MAC address of the first virtual interface is the same as the MAC address of the first non-Ethernet interface, data arriving at the first non-Ethernet interface on the interface extension device can arrive at the first virtual interface of the gateway device. In other words, the first non-Ethernet interface on the interface extension device is equivalent to the remote physical interface of the first virtual interface on the gateway device.

Optionally, the interface information further includes an interface type and a MAC address of a second non-Ethernet interface of the interface extension device. The gateway device creates, on the target Ethernet interface, a second virtual interface corresponding to the second non-Ethernet interface. An interface type of the second virtual interface is an Ethernet interface.

Optionally, after the gateway device creates the first virtual interface on the target Ethernet interface based on the interface information, the gateway device assigns an Internet Protocol (IP) address to the first virtual interface. The gateway device adds a routing entry corresponding to the first virtual interface to a routing table of the gateway device.

Optionally, after the gateway device sends the interface creation success notification to the interface extension device, the gateway device receives a network access notification sent by the interface extension device, where the network access notification includes an identifier of a to-be-joined network node. The to-be-joined network node is a network node that completes layer-2 networking with the interface extension device through the first non-Ethernet interface. The gateway device sends an IP address assignment notification to the to-be-joined network node through the interface extension device, where the IP address assignment notification includes an IP address of the to-be-joined network node. The IP address of the to-be-joined network node and the IP address of the first virtual interface belong to a same network segment. A source MAC address of the IP address assignment notification is the MAC address of the first virtual interface. A destination MAC address of the IP address assignment notification is a MAC address of the to-be-joined network node. The MAC address of the first virtual interface is the same as the MAC address of the first non-Ethernet interface.

Optionally, the network access notification includes an identifier of the first non-Ethernet interface. The identifier may be specifically the MAC address of the first non-Ethernet interface. For example, a source MAC address of the network access notification may be the MAC address of the first non-Ethernet interface. The network access notification may include one or more identifiers of one or more to-be-joined network nodes, and the one or more identifiers of the one or more to-be-joined network nodes may be carried in a data field of a payload of an Ethernet frame.

In this application, the IP address of the to-be-joined network node and the IP address of the first virtual interface belong to a same network segment. In other words, a network address in the IP address assigned by the gateway device to the to-be-joined network node is the same as the IP address of the first virtual interface. The first virtual interface is a virtual interface used by the gateway device to perform layer-3 network communication with the to-be-joined network node.

Optionally, the identifier of the to-be-joined network node includes the MAC address of the to-be-joined network node. After the gateway device sends the IP address assignment notification to the to-be-joined network node through the interface extension device, the gateway device adds a neighbor entry corresponding to the to-be-joined network node to a neighbor table of the gateway device.

Optionally, an Ethernet frame is used for information transmission between the gateway device and the interface extension device. The Ethernet frame includes a target indication field. The target indication field is used to indicate a packet type of the Ethernet frame. The packet type includes a management packet or a data packet. A destination device of the management packet is the gateway device or the interface extension device. A destination device of the data packet is neither the gateway device nor the interface extension device.

Optionally, the target indication field is further used to indicate a virtual interface of the gateway device for transmission of the Ethernet frame.

Optionally, the target indication field includes a first indication field and a second indication field. The first indication field is used to indicate the packet type of the Ethernet frame. The second indication field is used to indicate a virtual interface of the gateway device for transmission of the Ethernet frame.

Optionally, the target indication field is a tag protocol identifier field.

Optionally, the Ethernet frame further includes a tag control information (TCI) field. When the packet type of the Ethernet frame is the management packet, the TCI field is used to indicate a packet length of the Ethernet frame. When the packet type of the Ethernet frame is the data packet, the TCI field is used to indicate a priority of the Ethernet frame.

Optionally, after the gateway device sends the interface creation success notification to the interface extension device, the gateway device sends an interface parameter to the interface extension device, where the interface parameter includes a channel and/or transmit power of the first non-Ethernet interface. The gateway device may generate a corresponding interface parameter based on the interface type of the first non-Ethernet interface.

According to a second aspect, an interface extension method is provided. The method includes the following steps:

An interface extension device sends interface information to a gateway device, where an Ethernet interface of the interface extension device is connected to a target Ethernet interface of the gateway device, the interface information includes an interface type and a MAC address of a first non-Ethernet interface of the interface extension device, so that the gateway device creates, on the target Ethernet interface based on the interface information, a first virtual interface corresponding to the first non-Ethernet interface, and an interface type of the first virtual interface is an Ethernet interface; and the interface extension device receives an interface creation success notification sent by the gateway device, where the interface creation success notification is used to indicate the interface extension device that the gateway device has completed creation of a virtual interface corresponding to a non-Ethernet interface in the interface information.

Optionally, that the first virtual interface corresponds to the first non-Ethernet interface includes: A MAC address of the first virtual interface is the same as the MAC address of the first non-Ethernet interface.

Optionally, the interface information further includes an interface type and a MAC address of a second non-Ethernet interface of the interface extension device, so that the gateway device creates, on the target Ethernet interface, a second virtual interface corresponding to the second non-Ethernet interface. An interface type of the second virtual interface is an Ethernet interface.

Optionally, after the interface extension device receives the interface creation success notification sent by the gateway device, and the interface extension device completes layer-2 networking with a to-be-joined network node through the first non-Ethernet interface, the interface extension device generates a network access notification, and sends the network access notification to the gateway device. The network access notification includes an identifier of the to-be-joined network node. The interface extension device receives an IP address assignment notification that is sent by the gateway device to the to-be-joined network node, converts a frame type of the IP address assignment notification into a target frame type, sends an IP address assignment notification whose frame type is the target frame type to the to-be-joined network node through the first non-Ethernet interface, where the IP address assignment notification includes an IP address of the to-be-joined network node. The target frame type is a frame type supported by a network to which the to-be-joined network node belongs. The IP address of the to-be-joined network node and an IP address of the first virtual interface belong to a same network segment. A source MAC address of the IP address assignment notification is the MAC address of the first virtual interface. A destination MAC address of the IP address assignment notification is a MAC address of the to-be-joined network node. The MAC address of the first virtual interface is the same as the MAC address of the first non-Ethernet interface.

Optionally, the network access notification includes an identifier of the first non-Ethernet interface. The identifier may be specifically the MAC address of the first non-Ethernet interface. For example, a source MAC address of the network access notification may be the MAC address of the first non-Ethernet interface. The network access notification may include identifiers of one or more to-be-joined network nodes, and the identifiers of the one or more to-be-joined network nodes may be carried in a data field of a payload of an Ethernet frame.

In this application, the interface extension device implements conversion between an Ethernet frame type and the target frame type, that is, implements layer-2 protocol conversion. Therefore, a layer-2 protocol conversion module does not need to be disposed in the gateway device, so that resource consumption of the gateway device can be reduced.

Optionally, an Ethernet frame is used for information transmission between the gateway device and the interface extension device. The Ethernet frame includes a target indication field. The target indication field is used to indicate a packet type of the Ethernet frame. The packet type includes a management packet or a data packet. A destination device of the management packet is the gateway device or the interface extension device. A destination device of the data packet is neither the gateway device nor the interface extension device.

Optionally, the target indication field is further used to indicate a virtual interface of the gateway device for transmission of the Ethernet frame.

Optionally, the target indication field includes a first indication field and a second indication field. The first indication field is used to indicate the packet type of the Ethernet frame. The second indication field is used to indicate a virtual interface of the gateway device for transmission of the Ethernet frame.

Optionally, the target indication field is a tag protocol identifier field.

Optionally, the Ethernet frame further includes a TCI field. When the packet type of the Ethernet frame is the management packet, the TCI field is used to indicate a packet length of the Ethernet frame. When the packet type of the Ethernet frame is the data packet, the TCI field is used to indicate a priority of the Ethernet frame.

According to a third aspect, an interface extension apparatus is provided, and is used in a gateway device. The apparatus includes a plurality of functional modules, and the plurality of functional modules interact with each other to implement the method according to the first aspect and the implementations of the first aspect. The plurality of functional modules may be implemented based on software, hardware, or a combination of software and hardware, and the plurality of functional modules may be randomly combined or divided depending on specific implementation.

According to a fourth aspect, an interface extension apparatus is provided, and is used in an interface extension device. The apparatus includes a plurality of functional modules, and the plurality of functional modules interact with each other to implement the method according to the second aspect and the implementations of the second aspect. The plurality of functional modules may be implemented based on software, hardware, or a combination of software and hardware, and the plurality of functional modules may be randomly combined or divided depending on specific implementation.

According to a fifth aspect, a gateway device is provided, where the gateway device includes a processor and a memory.

The memory is configured to store a computer program, where the computer program includes program instructions.

The processor is configured to invoke the computer program to implement the interface extension method according to any one of the first aspect or the implementations of the first aspect.

According to a sixth aspect, an interface extension device is provided, where the interface extension device includes a processor and a memory.

The memory is configured to store a computer program, where the computer program includes program instructions.

The processor is configured to invoke the computer program to implement the interface extension method according to any one of the second aspect or the implementations of the second aspect.

According to a seventh aspect, an interface extension system is provided, where the interface extension system includes a gateway device and an interface extension device. An Ethernet interface of the gateway device is connected to an Ethernet interface of the interface extension device.

The gateway device includes the interface extension apparatus according to any one of the third aspect or the implementations of the third aspect, and the interface extension device includes the interface extension apparatus according to any one of the fourth aspect or the implementations of the fourth aspect.

According to an eighth aspect, a computer storage medium is provided, where the computer storage medium stores instructions. When the instructions are executed by a processor of a gateway device, the interface extension method according to any one of the first aspect or the implementations of the first aspect is implemented.

According to a ninth aspect, a computer storage medium is provided, where the computer storage medium stores instructions. When the instructions are executed by a processor of an interface extension device, the interface extension method according to any one of the second aspect or the implementations of the second aspect is implemented.

According to a tenth aspect, a chip is provided, where the chip includes a programmable logic circuit and/or program instructions. When the chip runs, the interface extension method according to any one of the first aspect or the implementations of the first aspect is implemented. The chip may be a chip of an Ethernet adapter.

According to an eleventh aspect, a chip is provided, where the chip includes a programmable logic circuit and/or program instructions. When the chip runs, the interface extension method according to any one of the second aspect or the implementations of the second aspect is implemented. The chip includes a chip of an Ethernet adapter, and further includes a non-Ethernet chip, for example, a PLC chip.

The technical solutions provided in this application bring at least the following beneficial effects:

The target Ethernet interface of the gateway device is connected to the Ethernet interface of the interface extension device, and the gateway device creates, on the target Ethernet interface, the first virtual interface corresponding to the first non-Ethernet interface of the interface extension device. Because the MAC address of the first virtual interface is the same as the MAC address of the first non-Ethernet interface, data arriving at the first non-Ethernet interface on the interface extension device can arrive at the first virtual interface of the gateway device. In other words, the first non-Ethernet interface on the interface extension device is equivalent to a remote physical interface of the first virtual interface on the gateway device. This implements interface extension of the gateway device, so that the gateway device can be connected to the perception layer network through the non-Ethernet interface on the interface extension device. In other words, the gateway device can be connected to different perception layer networks through the interface extension device provided that the gateway device includes an Ethernet interface. The gateway device has good generality. In addition, the interface extension device implements layer-2 protocol conversion between Ethernet and the perception layer network, and the gateway device implements the layer-3 forwarding function, so that heterogeneous perception layer networks can communicate with each other. In addition, the gateway device and the interface extension device may be separately deployed, so that the interface extension device can be remotely deployed. Therefore, flexibility of device deployment is high.

DESCRIPTION OF EMBODIMENTS

To make objectives, technical solutions, and advantages of this application clearer, the following further describes implementations of this application in detail with reference to accompanying drawings.

Figure 1:
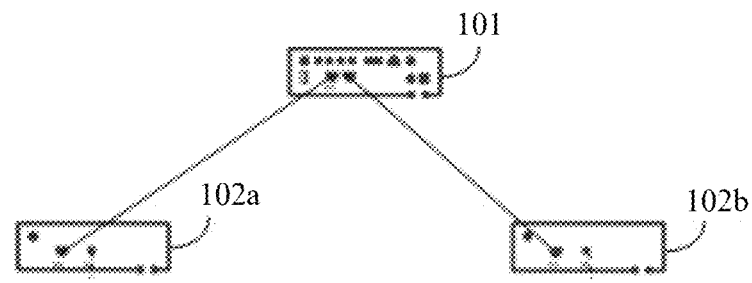
FIG. 1 is a schematic diagram depicting a structure of an interface extension system according to an embodiment of this application.

FIG. 1 is a schematic diagram depicting a structure of an interface extension system according to an embodiment of this application. As shown in FIG. 1, the interface extension system includes a gateway device 101 and interface extension devices 102a and 102b (collectively referred to as interface extension devices 102). A quantity of interface extension devices shown in FIG. 1 is merely an example, and does not constitute any limitation on the interface extension system provided in this embodiment of this application. For example, the gateway device 101 may be connected to one interface extension device 102. Alternatively, the gateway device 101 may be connected to three, four, or more interface extension devices 102.

The gateway device 101 includes an Ethernet interface, and the interface extension device 102 includes an Ethernet interface and a non-Ethernet interface. Optionally, there may be one or more Ethernet interfaces on the gateway device 101. There may be one or more Ethernet interfaces on the interface extension device 102. There may also be one or more non-Ethernet interfaces on the interface extension device 102. For example, refer to FIG. 1. There are at least two Ethernet interfaces on the gateway device 101. One of the Ethernet interfaces on the gateway device 101 is connected to an Ethernet interface of the interface extension device 102a, and the other of the Ethernet interfaces on the gateway device 101 is connected to an Ethernet interface of the interface extension device 102b. Certainly, there may also be one or more non-Ethernet interfaces on the gateway device 101. This is not limited in this embodiment of this application.

Optionally, a non-Ethernet interface on the interface extension device may include a network interface and/or an operation technology (OT) interface. The network interface includes a PLC interface, an RF interface, a ZIGBEE interface, a BLUETOOTH interface, and the like. The OT interface includes an RS232 interface, an RS485 interface, a controller area network (CAN) interface, and the like.

Figure 2:
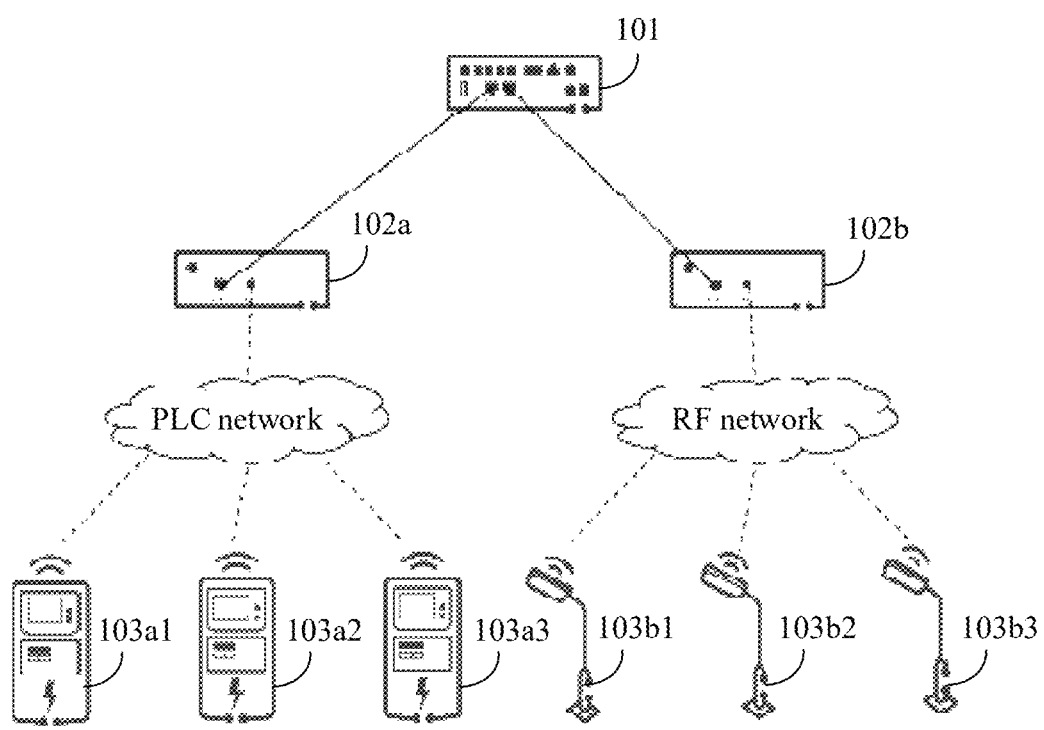
FIG. 2 is a schematic diagram of an application scenario related to an interface extension system according to an embodiment of this application.

For example, FIG. 2 is a schematic diagram of an application scenario related to an interface extension system according to an embodiment of this application. In the application scenario shown in FIG. 2, assuming that an interface extension device 102a includes a PLC interface, and an interface extension device 102b includes an RF interface, a gateway device 101 may be connected to a PLC network through the interface extension device 102a, and connected to an RF network through the interface extension device 102b. Refer to FIG. 2. Perception layer devices 103a1 to 103a3 are connected to the interface extension device 102a through the PLC network, and perception layer devices 103b1 to 103b3 are connected to the interface extension device 102b through the RF network. The PLC network and the RF network each include network nodes. A quantity of network nodes in a perception layer network matches a quantity of connected perception layer devices, that is, the network nodes are connected to the perception layer devices in a one-to-one correspondence. The perception layer devices 103a1 to 103a3 are connected to the interface extension device 102a through the PLC network, that is, the perception layer devices 103a1 to 103a3 each are connected to the interface extension device 102a through a network node in the PLC network. The perception layer devices 103b1 to 103b3 are connected to the interface extension device 102b through the RF network, that is, the perception layer devices 103b1 to 103b3 each are connected to the interface extension device 102b through a network node in the RF network. The PLC network and the RF network each may be a mesh network, and the mesh network features multi-hop interconnection and a mesh topology. Refer to FIG. 2. The perception layer devices 103a1 to 103a3 may be smart meters, and the perception layer devices 103b1 to 103b3 may be smart lamps. A network node in the perception layer network may be a standalone device, or may be integrated into a perception layer device as a functional module. This is not limited in this embodiment of this application.

In the application scenario shown in FIG. 2, when the perception layer device generates running data information, the perception layer device transmits the running data information to a corresponding network node in the perception layer network. The network node sends the running data information to a gateway device through the interface extension device. The gateway device sends the running data information to a corresponding remote monitoring device in an external network or a network node in another perception layer network.

In this embodiment of this application, the gateway device is connected to an Ethernet interface of the interface extension device through an Ethernet interface, and virtualizes, on the Ethernet interface, a virtual interface corresponding to a non-Ethernet interface of the interface extension device. This implements interface extension of the gateway device, so that the gateway device can be connected to the perception layer network through the non-Ethernet interface on the interface extension device. In other words, the gateway device can be connected to different perception layer networks through the interface extension device provided that the gateway device includes an Ethernet interface. The gateway device has good generality. In addition, the gateway device and the interface extension device may be separately deployed, so that the interface extension unit can be remotely deployed. Therefore, flexibility of device deployment is high.

Figure 3:
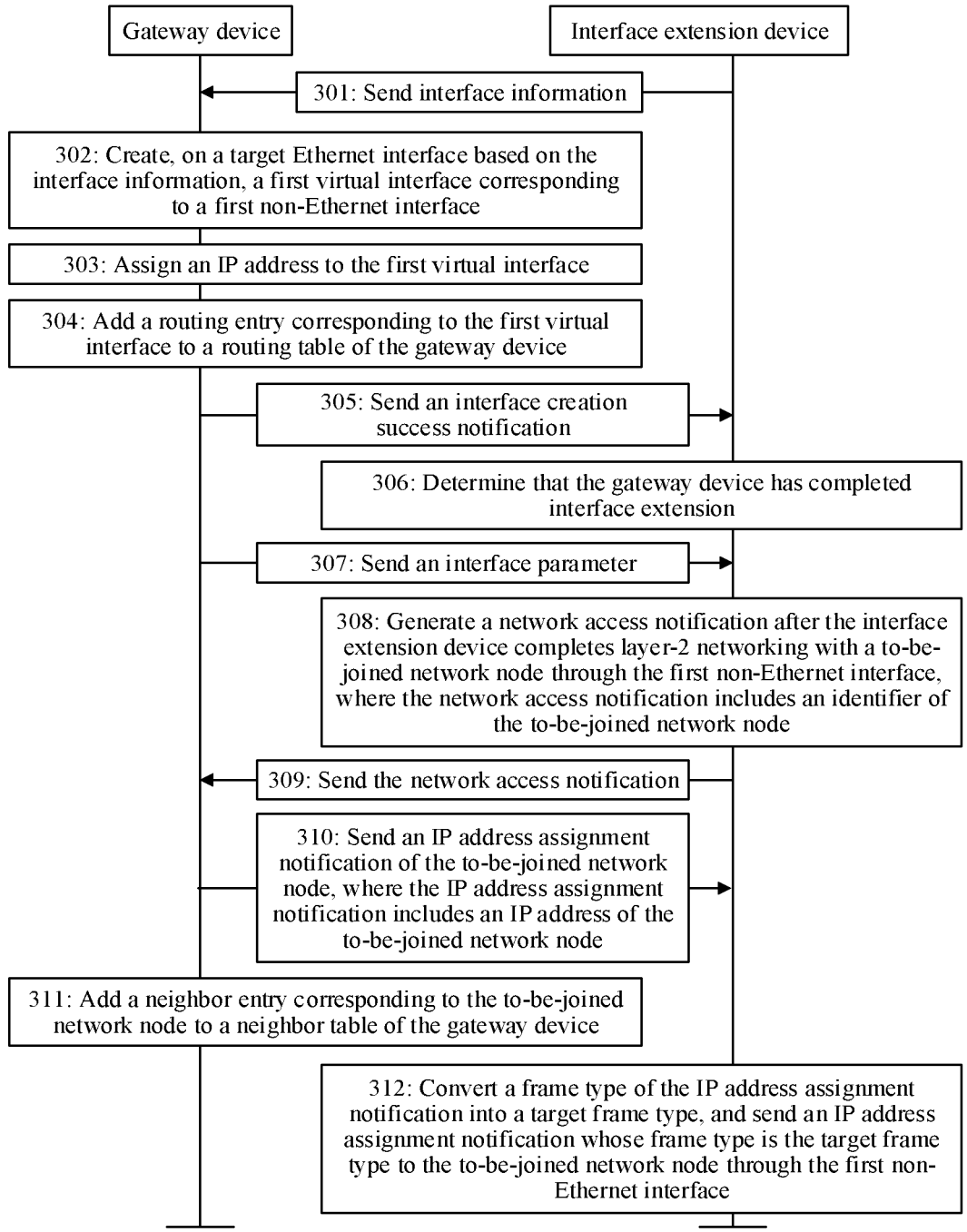
FIG. 3 is a flowchart of an interface extension method according to an embodiment of this application.

FIG. 3 is a flowchart of an interface extension method according to an embodiment of this application. The method may be used in the interface extension system shown in FIG. 1. As shown in FIG. 3, the method includes the following steps.

Step 301: An interface extension device sends interface information to a gateway device.

The interface extension device may be any interface extension device in the interface extension system shown in FIG. 1. The interface extension device includes an Ethernet interface and n non-Ethernet interfaces, and MAC addresses of the n non-Ethernet interfaces may be the same or different. For example, MAC addresses of non-Ethernet interfaces of different interface types may be the same. n is a positive integer. The Ethernet interface of the interface extension device is connected to a target Ethernet interface of the gateway device. The interface information includes an interface type and a MAC address of a first non-Ethernet interface of the interface extension device. The first non-Ethernet interface may be any non-Ethernet interface on the interface extension device, or the first non-Ethernet interface may be a non-Ethernet interface of the interface extension device connected to a perception layer network.

Optionally, when a quantity n of non-Ethernet interfaces on the interface extension device is greater than or equal to 2, in a first possible implementation, the interface information includes interface types and corresponding MAC addresses of the n non-Ethernet interfaces. For example, if the interface extension device includes three non-Ethernet interfaces 1 to 3, the interface information includes an interface type (PLC) and a MAC address (MAC1) of the non-Ethernet interface 1, an interface type (PLC) and a MAC address (MAC2) of the non-Ethernet interface 2, and an interface type (RF) and a MAC address (MAC3) of the non-Ethernet interface 3. The interface information may be understood as a 2-tuple including an interface type and a MAC address. In a second implementation, the interface information includes only an interface type and a corresponding MAC address of a non-Ethernet interface connected to the perception layer network. When a non-Ethernet interface on the interface extension device that is not connected to the perception layer network is subsequently connected to the perception layer network, the interface extension device may send the interface information that includes the interface type and the MAC address of the non-Ethernet interface to the gateway device.

In the second possible implementation, the gateway device does not need to perform interface extension based on the non-Ethernet interface on the interface extension device that is not connected to the perception layer network. This can save resources of the gateway device.

Optionally, the interface information may be carried in a data field of a payload of an Ethernet frame for sending after being type-length-value (TLV)-encoded. Certainly, the interface information may alternatively be encoded in another encoding scheme and then carried in the data field of the payload of the Ethernet frame for sending. The encoding scheme is not limited in this embodiment of this application.

Optionally, after the Ethernet interface of the interface extension device is connected to the target Ethernet interface of the gateway device, security authentication and key negotiation may be performed between the interface extension device and the gateway device. Optionally, the security authentication and the key negotiation may be performed between the interface extension device and the gateway device according to a Transport Layer Security (TLS) protocol. After the security authentication and the key negotiation are completed between the interface extension device and the gateway device, data is transmitted between the interface extension device and the gateway device in an encryption mode. Step 301 is implemented as follows: The interface extension device encrypts the interface information, and sends the encrypted interface information to the gateway device.

Step 302: The gateway device creates, on the target Ethernet interface based on the interface information, a first virtual interface corresponding to the first non-Ethernet interface.

An interface type of the first virtual interface is an Ethernet interface. That the first virtual interface corresponds to the first non-Ethernet interface includes: A MAC address of the first virtual interface is the same as the MAC address of the first non-Ethernet interface. The gateway device may implement layer-3 data forwarding through the first virtual interface. The gateway device may store a correspondence between the interface type of the first virtual interface and the interface type of the first non-Ethernet interface.

Optionally, the interface information further includes an interface type and a MAC address of a second non-Ethernet interface of the interface extension device. The gateway device creates, on the target Ethernet interface based on the interface information, a second virtual interface corresponding to the second non-Ethernet interface. An interface type of the second virtual interface is also an Ethernet interface. A MAC address of the second virtual interface is the same as the MAC address of the second non-Ethernet interface.

For example, if the first non-Ethernet interface is a PLC interface, the first virtual interface is a virtual interface corresponding to the PLC interface. If the first non-Ethernet interface is an RF interface, the first virtual interface is a virtual interface corresponding to the RF interface. If the first non-Ethernet interface is a ZIGBEE interface, the first virtual interface is a virtual interface corresponding to the ZIGBEE interface.

Step 303: The gateway device assigns an IP address to the first virtual interface.

An IP address generally includes two parts: a network identifier number and a host identifier number. Therefore, the IP address may include two parts: a network address and a host address. The two parts are usually distinguished between each other by using a subnet mask. Optionally, the IP address assigned by the gateway device to the virtual interface may be an Internet Protocol version 4 (IPv4) address, an Internet Protocol version 6 (IPv6) address, or any further IP address. This is not limited in this embodiment of this application. A virtual interface functions as a gateway of the lower perception layer network. The IP address assigned by the gateway device to the virtual interface is a network address, which is also referred to as a subnet address or a network segment address.

For example, an IP address assigned by the gateway device to the virtual interface corresponding to the PLC interface is 2001::/64, an IP address assigned by the gateway device to the virtual interface corresponding to the RF interface is 2002::/64, and an IP address assigned by the gateway device to the virtual interface corresponding to the ZIGBEE interface is 2003::/64.

Step 304: The gateway device adds a routing entry corresponding to the first virtual interface to a routing table of the gateway device.

For example, the routing table of the gateway device is shown in Table 1.

TABLE 1

| Index (Index) | Destination IP address | Next hop (next hop) | Port |
| --- | --- | --- | --- |
| 1 | 2001::/64 | On link | PLC virtual interface |
| 2 | 2002::/64 | On link | RF virtual interface |
| 3 | 2003::/64 | On link | ZIGBEE virtual interface |

A value in the "port" column in Table 1 is specifically an interface identifier. For ease of understanding, the PLC/RF/ZIGBEE virtual interface is used as an interface identifier to represent a specific interface in this application. Table 1 includes three routing entries. The three routing entries respectively indicate that an outbound interface destined for a network address or subnet 2001::/64 is a PLC virtual interface, an outbound interface destined for a network address or subnet 2002::/64 is an RF virtual interface, and an outbound interface destined for a network address or subnet 2003::/64 is a ZIGBEE virtual interface. To be specific, when receiving a packet whose network address in a destination IP address is 2001::/64 (that is, the destination IP address is in an address segment 2001::/64), the gateway device may learn, by querying the routing table shown in Table 1, that a next-hop port is the PLC virtual interface. In this case, the gateway device forwards the packet through the PLC virtual interface. When receiving a packet whose network address in a destination IP address is 2002::/64, the gateway device may learn, by querying the routing table shown in Table 1, that a next-hop port is the RF virtual interface. In this case, the gateway device forwards the packet through the RF virtual interface. When receiving a packet whose network address in a destination IP address is 2003::/64, the gateway device may learn, by querying the routing table shown in Table 1, that the next-hop port is the ZIGBEE virtual interface. In this case, the gateway device forwards the packet through the ZIGBEE virtual interface. "On link" indicates a direct connection. Assuming that the first virtual interface is the virtual interface corresponding to the PLC interface, referring to the example in step 303, an IP address assigned to the first virtual interface is 2001::/64. In this case, a routing entry whose index is 1 in Table 1 is a routing entry corresponding to the first virtual interface.

Step 305: The gateway device sends an interface creation success notification to the interface extension device.

Optionally, after creating the first virtual interface on the target Ethernet interface, the gateway device sends the interface creation success notification to the interface extension device. The interface creation success notification is used to indicate the interface extension device that the gateway device has completed creation of a virtual interface corresponding to a non-Ethernet interface in the interface information. Optionally, step 305 may be performed before step 303 and step 304, or step 305 may be performed simultaneously with step 303 and step 304. This is not limited in this embodiment of this application.

Step 306: The interface extension device determines that the gateway device has completed interface extension.

The interface extension device determines that the gateway device has completed the interface extension, that is, the interface extension device determines that the gateway device can perform layer-3 data forwarding. In this case, the interface extension device may send a network access notification of a to-be-joined network node to the gateway device, to complete layer-3 networking between the to-be-joined network node and the gateway device.

In this embodiment of this application, the target Ethernet interface of the gateway device is connected to the Ethernet interface of the interface extension device, so that the gateway device creates, on the target Ethernet interface, the first virtual interface corresponding to the first non-Ethernet interface of the interface extension device. Because the MAC address of the first virtual interface is the same as the MAC address of the first non-Ethernet interface, data arriving at the first non-Ethernet interface on the interface extension device can arrive at the first virtual interface of the gateway device. In other words, the first non-Ethernet interface on the interface extension device is equivalent to a remote physical interface of the first virtual interface on the gateway device. This implements interface extension of the gateway device, so that the gateway device can be connected to the perception layer network through the non-Ethernet interface on the interface extension device. In other words, the gateway device can be connected to different perception layer networks through the interface extension device provided that the gateway device includes an Ethernet interface. The gateway device has good generality.

Step 307: The gateway device sends an interface parameter to the interface extension device.

Optionally, after the gateway device sends the interface creation success notification to the interface extension device, the gateway device may further send the interface parameter to the interface extension device, where the interface parameter includes a channel and/or transmit power of the first non-Ethernet interface on the interface extension device.

Optionally, the gateway device may generate a corresponding interface parameter based on the interface type of the first non-Ethernet interface. Different types of non-Ethernet interfaces may have different interface parameters. For example, for the PLC interface, the interface parameter may further include a whitelist of PLC network nodes. The whitelist of PLC network nodes is used to indicate PLC network nodes that are allowed to access the gateway device through the interface extension device. For the RF interface and/or the ZIGBEE interface, the interface parameter may further include a modulation scheme. Certainly, a default interface parameter may be configured on the interface extension device. Alternatively, the gateway device may not send the interface parameter to the interface extension device, that is, step 307 may not be performed. This is not limited in this embodiment of this application.

Step 308: The interface extension device generates a network access notification after completing layer-2 networking with the to-be-joined network node through the first non-Ethernet interface, where the network access notification includes an identifier of the to-be-joined network node.

The identifier of the to-be-joined network node may be a MAC address of the to-be-joined network node, another hardware address that can uniquely identify the to-be-joined network node, or the like. The network access notification further includes the MAC address of the first non-Ethernet interface, so that the gateway device assigns an IP address to the to-be-joined network node based on the IP address (a network segment address) of the first virtual interface corresponding to the first non-Ethernet interface.

Optionally, the interface extension device may perform layer-2 networking with the to-be-joined network node before or after receiving the interface creation success notification sent by the gateway device. During layer-2 networking between the interface extension device and the to-be-joined network node, layer-2 network security authentication and key negotiation may further be performed, to improve security of data transmission between the interface extension device and the to-be-joined network node.

Step 309: The interface extension device sends the network access notification to the gateway device.

The interface extension device sends the network access notification to the gateway device only after receiving the interface creation success notification sent by the gateway device, to complete the layer-3 networking between the to-be-joined network node and the gateway device.

Step 310: The gateway device sends an IP address assignment notification of the to-be-joined network node to the interface extension device, where the IP address assignment notification includes an IP address of the to-be-joined network node.

A source MAC address of the IP address assignment notification is the MAC address of the first virtual interface, and a destination MAC address of the IP address assignment notification is a MAC address of the to-be-joined network node. The MAC address of the first virtual interface is the MAC address of the first non-Ethernet interface. After receiving the network access notification sent by the interface extension device, the gateway device may first perform layer-3 network security authentication and key negotiation with the to-be-joined network node. After performing the layer-3 network security authentication and the key negotiation with the to-be-joined network node, the gateway device assigns the IP address to the to-be-joined network node. During the layer-3 network security authentication and the key negotiation between the to-be-joined network node and the gateway device, data transmission may be implemented by using a link-local address. The link-local address is generated based on a MAC address. Optionally, the layer-3 network security authentication and the key negotiation between the to-be-joined network node and the gateway device may be performed according to a TLS protocol. After the layer-3 network security authentication and the key negotiation are completed between the to-be-joined network node and the gateway device, data is transmitted between the to-be-joined network node and the gateway device in an encryption mode. This can improve security of data transmission between the gateway device and the to-be-joined network node.

A neighbor table of the gateway device may prestore a neighbor entry based on the link-local address of the to-be-joined network node. For example, the neighbor table of the gateway device may be shown in Table 2.

TABLE 2

| Index | IP address | Port | MAC Address |
|---|---|---|---|
| 1 | FE80::IID-MAC-B | PLC virtual interface | MAC-B |
| 2 | FE80::IID-MAC-C | RF virtual interface | MAC-C |

During the layer-3 network security authentication and the key negotiation between the gateway device and the to-be-joined network node, if an IP address carried in an authentication message that is sent by the to-be-joined network node to the gateway device is FE80::IID-MAC-B, it can be learned based on Table 2 that a virtual interface used by the gateway device to communicate with the to-be-joined network node is the PLC virtual interface, and the MAC address of the to-be-joined network node is MAC-B. The gateway device performs MAC encapsulation on the IP address assignment notification by using a MAC address of the PLC virtual interface as a source MAC address and a MAC address MAC-B of the to-be-joined network node as a destination MAC address.

In this embodiment of this application, a network address in the IP address assigned by the gateway device to the to-be-joined network node is the same as the IP address of the first virtual interface of the gateway device. In other words, the IP address of the to-be-joined network node and the IP address of the first virtual interface belong to a same network segment. For example, assuming that the to-be-joined network node is a PLC network node, referring to the examples in step 303 and step 304, the network address in the IP address assigned by the gateway device to the to-be-joined network node is 2001::/64.

Because an IP address of a network node in the perception layer network and an IP address of a virtual interface on a corresponding gateway device belong to a same network segment, when the gateway device receives a packet that needs to be forwarded to a target network node in the perception layer network, the gateway device may parse an IP packet header of the packet to obtain an IP address; determine, based on a network address in the IP address and the routing table shown in Table 1, a virtual interface through which the packet is forwarded; and forward the packet to the target network node through the virtual interface. In this way, precise routing is implemented.

Step 311: The gateway device adds a neighbor entry corresponding to the to-be-joined network node to the neighbor table of the gateway device.

Optionally, when the network access notification sent by the interface extension device to the gateway device includes the MAC address of the to-be-joined network node, the gateway device may generate, based on the MAC address and the IP address of the to-be-joined network node, the neighbor entry corresponding to the to-be-joined network node; and add the neighbor entry to the neighbor table.

For example, based on Table 2, assuming that the IP address assigned by the gateway device to the to-be-joined network node is 2002::IID-MAC-B, and the MAC address of the to-be-joined network node is MAC-B, the neighbor entry corresponding to the to-be-joined network node added to the gateway device is an entry whose index is 3 shown in Table 3.

TABLE 3

| Index | IP address | Port | MAC Address |
|---|---|---|---|
| 1 | FE80::IID-MAC-B | PLC virtual interface | MAC-B |
| 2 | FE80::IID-MAC-C | RF virtual interface | MAC-C |
| 3 | 2001::IID-MAC-B | PLC virtual interface | MAC-B |

Based on Table 3, when a destination IP address carried in a packet received by the gateway device is 2001::IID-MAC-B, the gateway device may use the MAC address of the PLC virtual interface as a source MAC address, and use the MAC address of the to-be-joined network node as a destination MAC address, perform MAC layer encapsulation on the packet, and forward, through the PLC virtual interface, the packet on which the MAC layer encapsulation is performed to the to-be-joined network node.

Optionally, in IPv4, the neighbor table of the gateway device may be an Address Resolution Protocol (ARP) table. In IPv6, the neighbor table of the gateway device is a protocol-defined neighbor table.

Step 312: The interface extension device converts a frame type of the IP address assignment notification into a target frame type, and sends an IP address assignment notification whose frame type is the target frame type to the to-be-joined network node through the first non-Ethernet interface.

A frame type of the IP address assignment notification sent by the gateway device to the interface extension device is an Ethernet frame, and the target frame type is a frame type supported by a network to which the to-be-joined network node belongs. For example, when the to-be-joined network node is a PLC network node, the target frame type is a PLC MAC frame. When the to-be-joined network node is an RF network node, the target frame type is an RF MAC frame.

In this embodiment of this application, the interface extension device implements conversion between the Ethernet frame type and the target frame type, that is, implements layer-2 protocol conversion. Therefore, a layer-2 protocol conversion module does not need to be disposed in a gateway device, so that resource consumption of the gateway device can be reduced.

The interface extension device also supports protocols corresponding to various types of non-Ethernet interfaces on the interface extension device. For example, the interface extension device needs to support framing of a PLC carrier signal, and modulation and demodulation are supported at a MAC layer and a physical layer (PHY) of a PLC protocol.

Optionally, when an IPv6 address is used in this embodiment of this application, the interface extension device may further implement conversion between an IPv6 header and a IPv6 over Low-Power Wireless Personal Area Networks (6LowPAN) header. When forwarding a packet sent by the gateway device to a network node, the interface extension device converts an IPv6 header into a 6LowPAN header, to compress a packet header. In this way, less transmission resources are occupied.

Optionally, after receiving the IP address assignment notification, the to-be-joined network node may add the routing entry and the neighbor entry that correspond to the gateway device, and set a next hop of a default route to the gateway device, thereby implementing layer-3 network communication between the to-be-joined network node and the gateway device. In this embodiment of this application, the interface extension device implements layer-2 protocol conversion between Ethernet and the perception layer network, and the gateway device implements the layer-3 forwarding function, so that heterogeneous perception layer networks can communicate with each other.

In this embodiment of this application, an Ethernet frame is used for data transmission between the gateway device and the interface extension device. The Ethernet frame includes a target indication field, and the target indication field is used to indicate a packet type of the Ethernet frame. The packet type includes a management packet or a data packet. A destination device of the management packet is the gateway device or the interface extension device. A destination device of the data packet is neither the gateway device nor the interface extension device. Optionally, when the gateway device or the interface extension device receives the management packet, the gateway device or the interface extension device performs an operation indicated in a payload field of the management packet. When the gateway device or the interface extension device receives the data packet, the gateway device or the interface extension device forwards the data packet to another device. The target indication field is located in an Ethernet frame header.

In this embodiment of this application, a destination device of the interface information and the network access notification that are sent by the interface extension device to the gateway device is the gateway device. A destination device of the interface creation success notification and the interface parameter that are sent by the gateway device to the interface extension device is the interface extension device. Therefore, all these packets are management packets. In an Ethernet frame obtained by performing MAC layer encapsulation on the interface information, the interface creation success notification, the interface parameter, and the network access notification, the target indication field is used to indicate that a packet type of the Ethernet frame is a management packet. Both a destination MAC address and a source MAC address in the management packet each may be a fixed control address. For example, the destination MAC address may be 0180 C200 0001, and the source MAC address may be 0180 C200 0002. Alternatively, the destination MAC address and the source MAC address in the management packet may be other fixed non-hardware addresses. This is not limited in this embodiment of this application.

A destination device of the IP address assignment notification sent by the gateway device to the interface extension device is the to-be-joined network node. Therefore, the IP address assignment notification is a data packet. In an Ethernet frame obtained by performing MAC layer encapsulation on the IP address assignment notification, a target indication field is used to indicate that a packet type of the Ethernet frame is the data packet. A source MAC address in an Ethernet frame header encapsulated in the IP address assignment notification is a MAC address of a virtual interface, and a destination MAC address is the MAC address of the to-be-joined network node. Similarly, for another data packet, for example, a service packet sent from a network node accessed through the first non-Ethernet interface to another network node, a destination MAC address in an Ethernet frame header of the service packet is a MAC address of a virtual interface, and a source MAC address is a MAC address of the network node.

Optionally, different marks such as digits, characters, or letters may be carried in the target indication field, to distinguish between packet types of Ethernet frames. For example, when the target indication field carries a first value, it indicates that a packet type of an Ethernet frame is a management packet. When the target indication field carries a second value, it indicates that a packet type of an Ethernet frame is a data packet.

Figure 4:
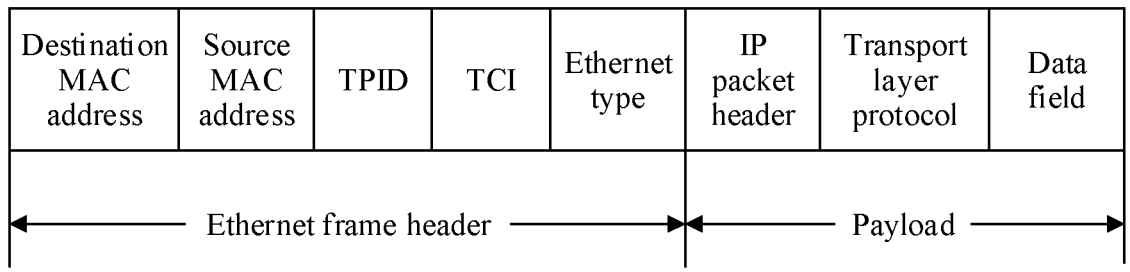
FIG. 4 is a schematic diagram depicting a structure of an Ethernet frame according to an embodiment of this application.

For example, FIG. 4 is a schematic diagram depicting a structure of an Ethernet frame according to this embodiment of this application. As shown in FIG. 4, the Ethernet frame includes an Ethernet frame header and a payload. For a structure of the Ethernet frame, refer to the Ethernet frame format defined in the Institute of Electrical and Electronics Engineers (IEEE) 802.1Q. The Ethernet frame header includes a destination MAC field, a source MAC field, a tag protocol identifier (TPID) field, a TCI field, and an Ethernet type (eth type) field. The destination MAC field has a length of 6 bytes, the source MAC field has a length of 6 bytes, the TPID field has a length of 2 bytes, the TCI field has a length of 2 bytes, and the Ethernet type field has a length of 2 bytes. The payload includes an IP packet header, a transport layer protocol field, and a data field. The target indication field may be the TPID field.

Optionally, when a packet type of an Ethernet frame is a management packet, the TCI field is used to indicate a packet length of the Ethernet frame; and the Ethernet type field may be used to indicate a service type of the Ethernet frame, for example, used to indicate that the Ethernet frame is a registration message (including an interface message, an interface creation success notification, and an interface parameter), an authentication message (including a network access notification), or the like. When a packet type of an Ethernet frame is a data packet, the TCI field is used to indicate a priority of the Ethernet frame; and the Ethernet type field is used to indicate an Ethernet type, including a used IP protocol. For example, when the Ethernet type field is 0x86DD, it indicates that the IPv6 protocol is used. When the Ethernet type field is 0x8100, it indicates that the IPv4 protocol is used. In this embodiment of this application, both the registration message and the authentication message may be carried in the data field of the payload of the Ethernet frame for sending after being TLV-encoded.

As described above, there may be a plurality of non-Ethernet interfaces on the interface extension device. For example, the interface extension device further includes the second non-Ethernet interface. The second virtual interface corresponding to the second non-Ethernet interface is further created on the target Ethernet interface. In other words, when the gateway device includes a plurality of virtual interfaces, the target indication field in the Ethernet frame is further used to indicate a virtual interface of the gateway device for transmission of the Ethernet frame. Optionally, when the MAC address of the first non-Ethernet interface and the MAC address of the second non-Ethernet interface are the same, the virtual interface used to transmit the Ethernet frame needs to be indicated by using the target indication field, so that the gateway device can forward the Ethernet frame through a correct virtual interface.

In a first possible implementation, the target indication field includes a first indication field and a second indication field. The first indication field is used to indicate the packet type of the Ethernet frame. The second indication field is used to indicate a virtual interface of the gateway device for transmission of the Ethernet frame. For example, the first byte of the TPID field may be used as the first indication field, and the second byte of the TPID field may be used as the second indication field. Alternatively, the TPID field may be used as the first indication field, and a new field added to the Ethernet frame is used as the second indication field. This is not limited in this embodiment of this application.

In a second possible implementation, the target indication field may be one field, and both the packet type of the Ethernet frame and the virtual interface for transmission of the Ethernet frame may be indicated by different content carried in the target indication field. For example, it is assumed that the gateway device includes two virtual interfaces: the first virtual interface and the second virtual interface. When the target indication field carries a first value, it indicates that the packet type of the Ethernet frame is the management packet, and the first virtual interface is used for transmission of the Ethernet frame. When the target indication field carries a second value, it indicates that the packet type of the Ethernet frame is the data packet, and the second virtual interface is used for transmission of the Ethernet frame. When the target indication field carries a third value, it indicates that the packet type of the Ethernet frame is the management packet, and the second virtual interface is used for transmission of the Ethernet frame. When the target indication field carries a fourth value, it indicates that the packet type of the Ethernet frame is the data packet, and the second virtual interface is used for transmission of the Ethernet frame.

A sequence of the steps of the interface extension method provided in this embodiment of this application may be properly adjusted. The steps may also be correspondingly added or removed as required. Any variation method readily figured out by a person skilled in the art within the technical scope disclosed in this application shall fall within the protection scope of this application. Therefore, details are not described herein.

In conclusion, in the interface extension method provided in this embodiment of this application, the target Ethernet interface of the gateway device is connected to the Ethernet interface of the interface extension device, so that the gateway device creates, on the target Ethernet interface, the first virtual interface corresponding to the first non-Ethernet interface of the interface extension device. Because the MAC address of the first virtual interface is the same as the MAC address of the first non-Ethernet interface, data arriving at the first non-Ethernet interface on the interface extension device can arrive at the first virtual interface of the gateway device. In other words, the first non-Ethernet interface on the interface extension device is equivalent to a remote physical interface of the first virtual interface on the gateway device. This implements interface extension of the gateway device, so that the gateway device can be connected to the perception layer network through the non-Ethernet interface on the interface extension device. In other words, the gateway device can be connected to different perception layer networks through the interface extension device provided that the gateway device includes an Ethernet interface. The gateway device has good generality. In addition, the interface extension device implements layer-2 protocol conversion between Ethernet and the perception layer network, and the gateway device implements the layer-3 forwarding function, so that heterogeneous perception layer networks can communicate with each other. In addition, the gateway device and the interface extension device may be separately deployed, so that the interface extension device can be remotely deployed. Therefore, flexibility of device deployment is high.

Figure 5:
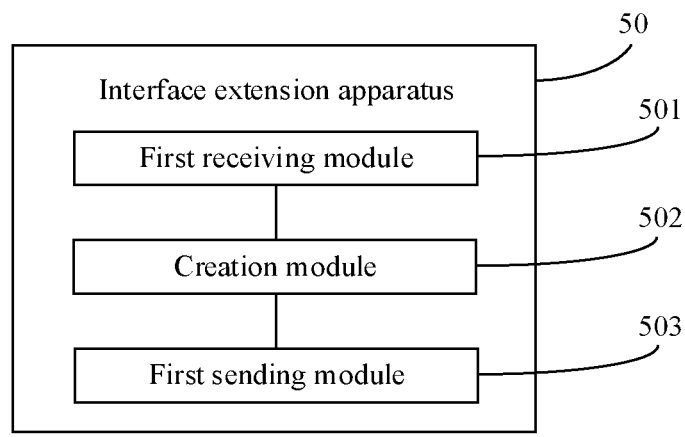
FIG. 5 is a schematic diagram depicting a structure of an interface extension apparatus according to an embodiment of this application.

FIG. 5 is a schematic diagram depicting a structure of an interface extension apparatus according to an embodiment of this application. The apparatus may be used in the gateway device 101 in the interface extension system shown in FIG. 1. As shown in FIG. 5, the apparatus 50 includes: a first receiving module 501, configured to receive interface information sent by an interface extension device, where an Ethernet interface of the interface extension device is connected to a target Ethernet interface of the gateway device, and the interface information includes an interface type and a MAC address of a first non-Ethernet interface of the interface extension device; a creation module 502, configured to create a first virtual interface on the target Ethernet interface based on the interface information, where the first virtual interface corresponds to the first non-Ethernet interface, and an interface type of the first virtual interface is an Ethernet interface; and a first sending module 503, configured to send an interface creation success notification to the interface extension device.

Optionally, that the first virtual interface corresponds to the first non-Ethernet interface includes: A MAC address of the first virtual interface is the same as the MAC address of the first non-Ethernet interface.

The interface information may further include an interface type and a MAC address of a second non-Ethernet interface of the interface extension device. The creation module 502 is further configured to create, on the target Ethernet interface, a second virtual interface corresponding to the second non-Ethernet interface. An interface type of the second virtual interface is an Ethernet interface.

Figure 6:
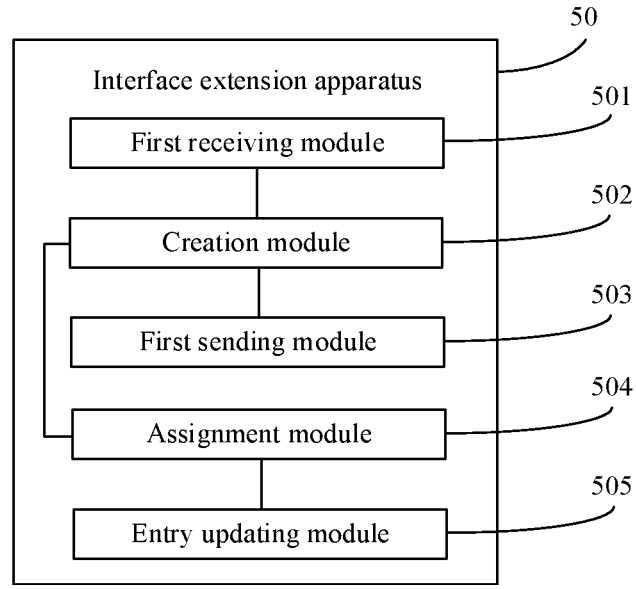
FIG. 6 is a schematic diagram depicting a structure of another interface extension apparatus according to an embodiment of this application.

Optionally, as shown in FIG. 6, the apparatus 50 further includes: an assignment module 504, configured to assign an IP address to the first virtual interface; and an entry updating module 505, configured to add a routing entry corresponding to the first virtual interface to a routing table of the gateway device.

Figure 7:
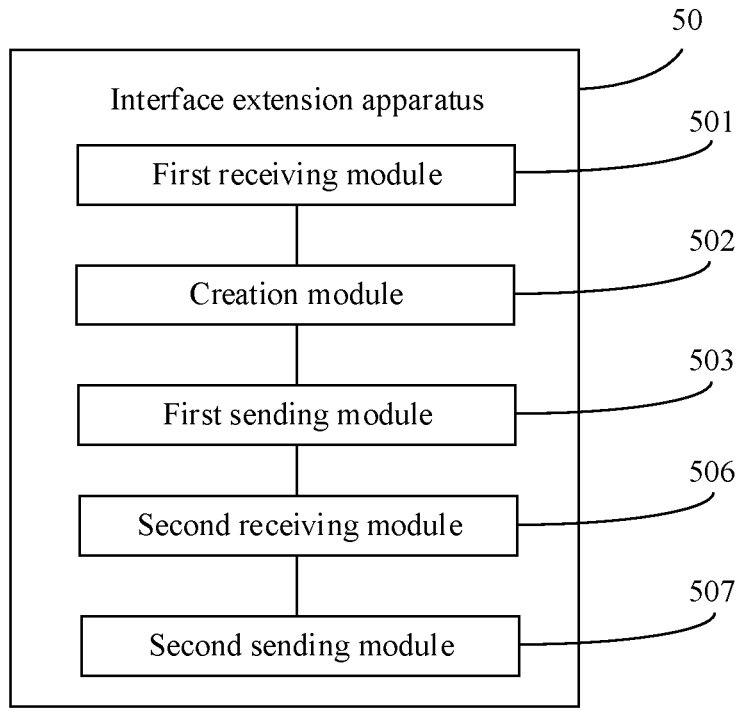
FIG. 7 is a schematic diagram depicting a structure of still another interface extension apparatus according to an embodiment of this application.

Optionally, as shown in FIG. 7, the apparatus 50 further includes: a second receiving module 506, configured to receive a network access notification sent by the interface extension device, where the network access notification includes an identifier of a to-be-joined network node, and the to-be-joined network node is a network node that completes layer-2 networking with the interface extension device through the first non-Ethernet interface; and a second sending module 507, configured to send an IP address assignment notification to the to-be-joined network node through the interface extension device, where the IP address assignment notification includes an IP address of the to-be-joined network node, the IP address of the to-be-joined network node and the IP address of the first virtual interface belong to a same network segment, a source MAC address of the IP address assignment notification is a MAC address of the first virtual interface, a destination MAC address of the IP address assignment notification is a MAC address of the to-be-joined network node, and the MAC address of the first virtual interface is the same as the MAC address of the first non-Ethernet interface.

Optionally, the identifier of the to-be-joined network node includes the MAC address of the to-be-joined network node. The entry updating module 505 in the apparatus 50 is further configured to add a neighbor entry corresponding to the to-be-joined network node to a neighbor table of the gateway device.

Optionally, an Ethernet frame is used for information transmission between the gateway device and the interface extension device. The Ethernet frame includes a target indication field. The target indication field is used to indicate a packet type of the Ethernet frame. The packet type includes a management packet or a data packet. A destination device of the management packet is the gateway device or the interface extension device. A destination device of the data packet is neither the gateway device nor the interface extension device.

Optionally, the target indication field is further used to indicate a virtual interface of the gateway device for transmission of the Ethernet frame.

Optionally, the target indication field includes a first indication field and a second indication field. The first indication field is used to indicate the packet type of the Ethernet frame. The second indication field is used to indicate a virtual interface of the gateway device for transmission of the Ethernet frame.

Optionally, the target indication field is a tag protocol identifier field.

Optionally, the Ethernet frame further includes a TCI field. When the packet type of the Ethernet frame is the management packet, the TCI field is used to indicate a packet length of the Ethernet frame. When the packet type of the Ethernet frame is the data packet, the TCI field is used to indicate a priority of the Ethernet frame.

Figure 8:
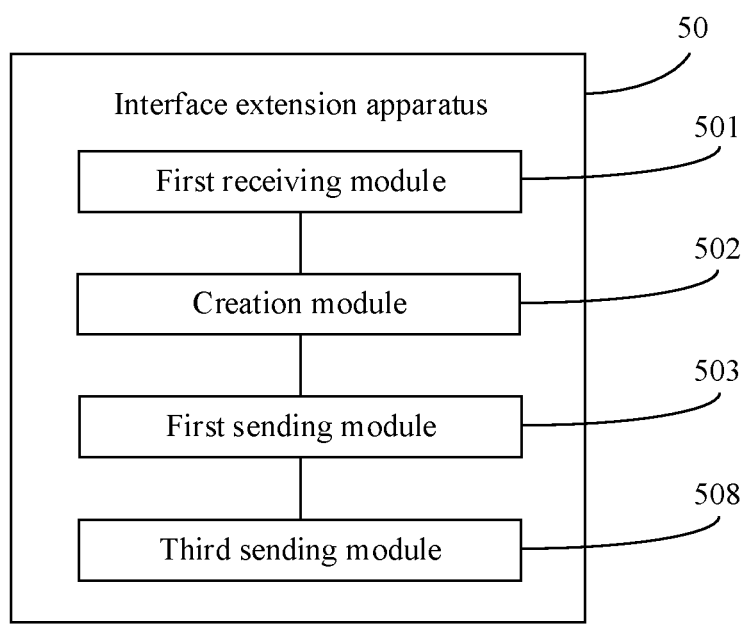
FIG. 8 is a schematic diagram depicting a structure of yet another interface extension apparatus according to an embodiment of this application.

Optionally, as shown in FIG. 8, the apparatus 50 further includes: a third sending module 508, configured to send an interface parameter to the interface extension device, where the interface parameter includes a channel and/or transmit power of the first non-Ethernet interface.

Optionally, the apparatus 50 further includes an enabling/disabling control module, configured to control whether the apparatus 50 enables the interface extension method provided in the embodiments of this application. When enabling is performed, the apparatus 50 performs the interface extension method shown in FIG. 3, that is, performs interface extension on the target Ethernet interface of the gateway device. When disabling is performed, the apparatus 50 does not perform the interface extension method shown in FIG. 3. In this case, the target Ethernet interface of the gateway device is used for common layer-2 and layer-3 communication.

For details not provided herein, refer to the detailed description in the interface extension method shown in FIG. 3.

In conclusion, in the interface extension apparatus provided in this embodiment of this application, the target Ethernet interface of the gateway device is connected to the Ethernet interface of the interface extension device, and the gateway device creates, on the target Ethernet interface, the first virtual interface corresponding to the first non-Ethernet interface of the interface extension device through a creation module. Because the MAC address of the first virtual interface is the same as the MAC address of the first non-Ethernet interface, data arriving at the first non-Ethernet interface on the interface extension device can arrive at the first virtual interface of the gateway device. In other words, the first non-Ethernet interface on the interface extension device is equivalent to a remote physical interface of the first virtual interface on the gateway device. This implements interface extension of the gateway device, so that the gateway device can be connected to the perception layer network through the non-Ethernet interface on the interface extension device. In other words, the gateway device can be connected to different perception layer networks through the interface extension device provided that the gateway device includes an Ethernet interface. The gateway device has good generality.

Figure 9:
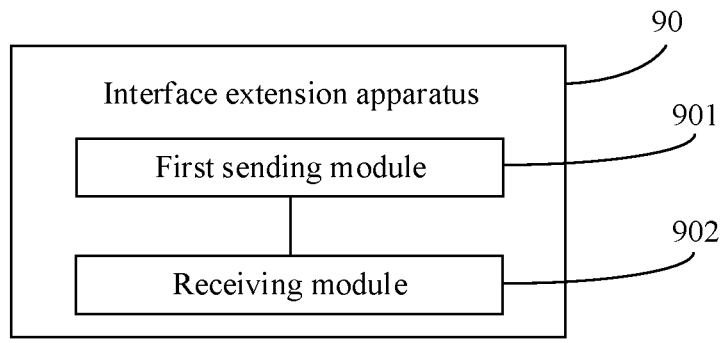
FIG. 9 is a schematic diagram depicting a structure of an interface extension apparatus according to another embodiment of this application.

FIG. 9 is a schematic diagram depicting a structure of an interface extension apparatus according to another embodiment of this application. The apparatus may be used in the interface extension device 102 in the interface extension system shown in FIG. 1. As shown in FIG. 9, the apparatus 90 includes: a first sending module 901, configured to send interface information to a gateway device, where an Ethernet interface of the interface extension device is connected to a target Ethernet interface of the gateway device, the interface information includes an interface type and a MAC address of a first non-Ethernet interface of the interface extension device, so that the gateway device creates, on the target Ethernet interface based on the interface information, a first virtual interface corresponding to the first non-Ethernet interface, and an interface type of the first virtual interface is an Ethernet interface; and a receiving module 902, configured to receive an interface creation success notification sent by the gateway device, where the interface creation success notification is used to indicate the interface extension apparatus that the gateway device has completed creation of a virtual interface corresponding to a non-Ethernet interface in the interface information.

The interface creation success notification is sent by the gateway device after the gateway device creates, on the target Ethernet interface based on the interface information, the virtual interface corresponding to the non-Ethernet interface.

Optionally, that the first virtual interface corresponds to the first non-Ethernet interface includes: A MAC address of the first virtual interface is the same as the MAC address of the first non-Ethernet interface.

Optionally, the interface information further includes an interface type and a MAC address of a second non-Ethernet interface of the interface extension device, so that the gateway device creates, on the target Ethernet interface, a second virtual interface corresponding to the second non-Ethernet interface. An interface type of the second virtual interface is an Ethernet interface.

Figure 10:
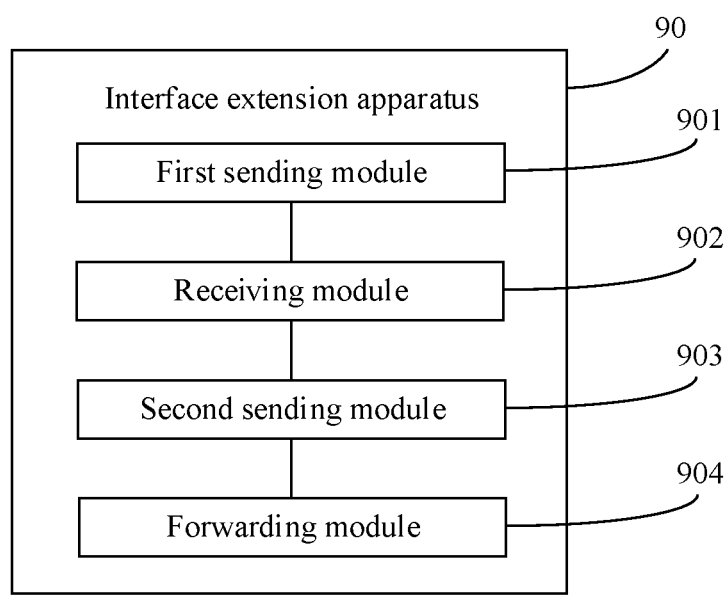
FIG. 10 is a schematic diagram depicting a structure of another interface extension apparatus according to another embodiment of this application.

Optionally, as shown in FIG. 10, the apparatus 90 further includes: a second sending module 903, configured to send a network access notification to the gateway device after the interface extension device completes layer-2 networking with a to-be-joined network node through the first non-Ethernet interface, where the network access notification includes an identifier of the to-be-joined network node; and a forwarding module 904, configured to: receive an IP address assignment notification that is sent by the gateway device to the to-be-joined network node, convert a frame type of the IP address assignment notification into a target frame type, send an IP address assignment notification whose frame type is the target frame type to the to-be-joined network node through the first non-Ethernet interface, where the IP address assignment notification includes an IP address of the to-be-joined network node, and the target frame type is a frame type supported by a network to which the to-be-joined network node belongs. The IP address of the to-be-joined network node and an IP address of the first virtual interface belong to a same network segment. A source MAC address of the IP address assignment notification is a MAC address of the first virtual interface. A destination MAC address of the IP address assignment notification is a MAC address of the to-be-joined network node. The MAC address of the first virtual interface is the same as the MAC address of the first non-Ethernet interface.

Optionally, an Ethernet frame is used for information transmission between the gateway device and the interface extension device. The Ethernet frame includes a target indication field. The target indication field is used to indicate a packet type of the Ethernet frame. The packet type includes a management packet or a data packet. A destination device of the management packet is the gateway device or the interface extension device. A destination device of the data packet is neither the gateway device nor the interface extension device.

Optionally, the target indication field is further used to indicate a virtual interface of the gateway device for transmission of the Ethernet frame.

Optionally, the target indication field includes a first indication field and a second indication field. The first indication field is used to indicate the packet type of the Ethernet frame. The second indication field is used to indicate a virtual interface of the gateway device for transmission of the Ethernet frame.

Optionally, the target indication field is a tag protocol identifier field.

Optionally, the Ethernet frame further includes a tag control information TCI field. When the packet type of the Ethernet frame is the management packet, the TCI field is used to indicate a packet length of the Ethernet frame. When the packet type of the Ethernet frame is the data packet, the TCI field is used to indicate a priority of the Ethernet frame.

For details not provided herein, refer to the detailed description in the interface extension method shown in FIG. 3.

In conclusion, in the interface extension apparatus provided in this embodiment of this application, the interface extension device sends the interface information to the gateway device through the first sending module. The target Ethernet interface of the gateway device is connected to the Ethernet interface of the interface extension device, and the gateway device creates, on the target Ethernet interface, the first virtual interface corresponding to the first non-Ethernet interface of the interface extension device through a creation module. Because the MAC address of the first virtual interface is the same as the MAC address of the first non-Ethernet interface, data arriving at the first non-Ethernet interface on the interface extension device can arrive at the first virtual interface of the gateway device. In other words, the first non-Ethernet interface on the interface extension device is equivalent to a remote physical interface of the first virtual interface on the gateway device. This implements interface extension of the gateway device, so that the gateway device can be connected to the perception layer network through the non-Ethernet interface on the interface extension device. In other words, the gateway device can be connected to different perception layer networks through the interface extension device provided that the gateway device includes an Ethernet interface. The gateway device has good generality.

Figure 11:
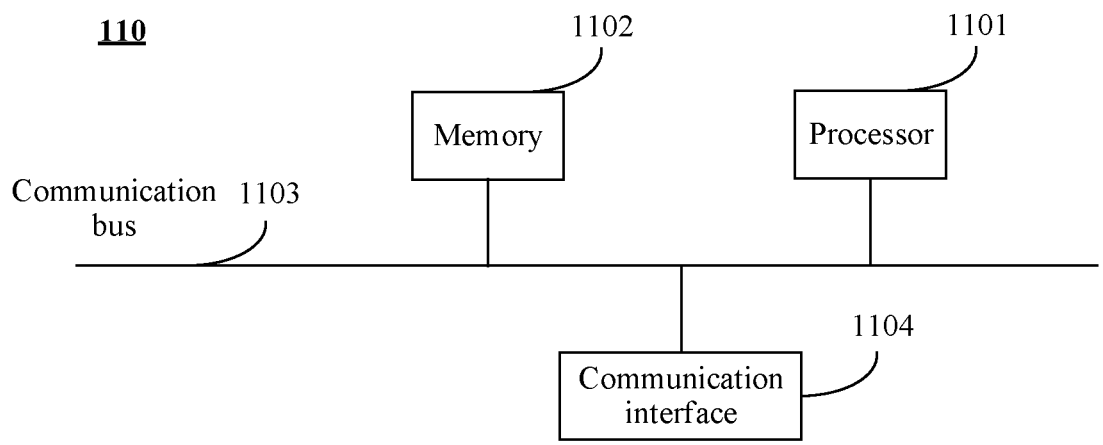
FIG. 11 is a block diagram of a gateway device according to an embodiment of this application.

FIG. 11 is a block diagram of a gateway device according to an embodiment of this application. As shown in FIG. 11, the gateway device 110 includes a processor 1101, a memory 1102, a communication bus 1103, and a communication interface 1104.

The processor 1101, the memory 1102, and the communication interface 1104 are connected to each other through the communication bus 1103. The communication bus 1103 may be a Peripheral Component Interconnect (PCI) bus, an extended industry standard architecture (EISA) bus, or the like. The communication bus may be classified into an address bus, a data bus, a control bus, and the like. For ease of representation, only one thick line is used to represent the bus in FIG. 11, but this does not mean that there is only one bus or only one type of bus.

The processor 1101 may be a central processing unit (CPU), a network processor (NP), or a combination of a CPU and an NP.

The processor 1101 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Optionally, the memory 1102 may be configured to store a computer program, where the computer program includes a program instructions. The processor 1101 is configured to invoke a computer program to implement steps performed by the gateway device in the interface extension method shown in FIG. 3.

The memory 1102 may include a volatile memory, for example, a random-access memory (RAM). The memory may alternatively include a non-volatile memory, for example, a flash memory, a hard disk drive (HDD), or a solid-state drive (SSD). The memory 1102 may further include a combination of the foregoing types of memories.

There may be a plurality of communication interfaces 1104. The communication interface 1104 is configured to communicate with another device, for example, communicate with an interface extension device. The communication interface 1104 includes a wired communication interface, and the wired communication interface includes an Ethernet interface. The Ethernet interface may be an optical interface, an electrical interface, or a combination thereof. The communication interface 1104 may further include a wireless communication interface. The wireless communication interface may be a wireless local area network (WLAN) interface, an RF interface, a ZIGBEE interface, a cellular network communication interface, or a combination thereof.

Figure 12:
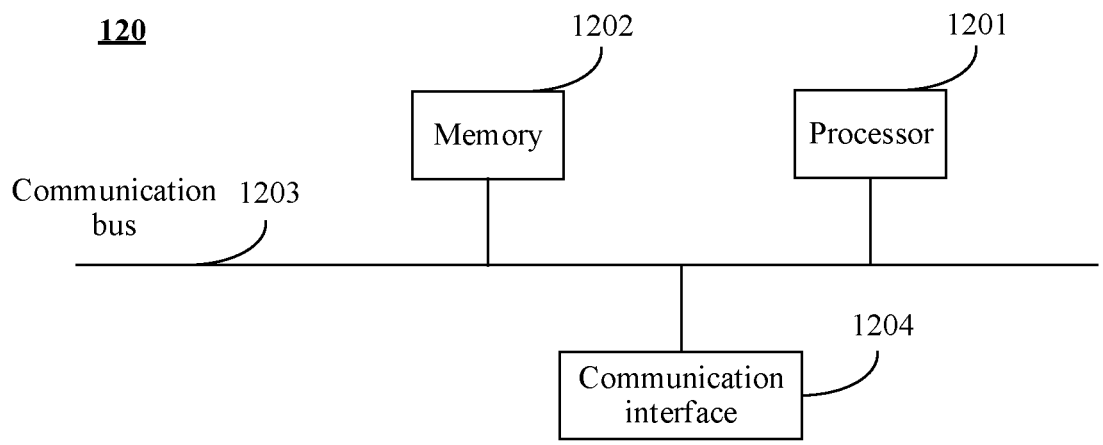
FIG. 12 is a block diagram of an interface extension device according to an embodiment of this application.

FIG. 12 is a block diagram of an interface extension device according to an embodiment of this application. As shown in FIG. 12, the interface extension device 120 includes a processor 1201, a memory 1202, a communication bus 1203, and a communication interface 1204.

The processor 1201, the memory 1202, and the communication interface 1204 are connected to each other through the communication bus 1203. The communication bus 1203 may be a PCI bus, an EISA bus, or the like. The communication bus may be classified into an address bus, a data bus, a control bus, and the like. For ease of representation, only one thick line is used to represent in FIG. 12, but this does not mean that there is only one bus or only one type of bus.

The processor 1101 may be a CPU, an NP, or a combination of a CPU and an NP.

The processor 1201 may further include a hardware chip. The hardware chip may be an ASIC, a PLD, or a combination thereof. The PLD may be a CPLD, an FPGA, a GAL, or any combination thereof.

Optionally, the memory 1202 may be configured to store a computer program, where the computer program includes program instructions. The processor 1201 executes the computer program stored in the memory 1202, to implement steps performed by the interface extension device in the interface extension method shown in FIG. 3.

The memory 1202 may include a volatile memory such as a RAM, a non-volatile memory such as a flash memory, an HDD, or an SSD, or a combination of the foregoing types of memories.

There may be a plurality of communication interfaces 1204. The communication interface 1204 is configured to communicate with another device, for example, communicate with a gateway device. The communication interface 1204 includes a wired communication interface, and the wired communication interface includes an Ethernet interface. The Ethernet interface may be an optical interface, an electrical interface, or a combination thereof. The wired communication interface may further include a PLC interface, an OT interface, and the like. The communication interface 1204 may further include a wireless communication interface. The wireless communication interface may be a WLAN interface, an RF interface, a ZIGBEE interface, a cellular network communication interface, or a combination thereof.

An embodiment of this application further provides an interface extension system. The interface extension system includes a gateway device and an interface extension device. An Ethernet interface of the gateway device is connected to an Ethernet interface of the interface extension device.

The gateway device includes the interface extension apparatus shown in any one of FIG. 5 to FIG. 8, and the interface extension device includes the interface extension apparatus shown in FIG. 9 or FIG. 10.

An embodiment of this application further provides a computer storage medium. The computer storage medium stores instructions. When the instructions are executed by a processor of a gateway device, steps performed by the gateway device in the interface extension method shown in FIG. 3 are implemented.

An embodiment of this application further provides another computer storage medium. The computer storage medium stores instructions. When the instructions are executed by a processor of an interface extension device, steps performed by the interface extension device in the interface extension method shown in FIG. 3 are implemented.

A person of ordinary skill in the art may understand that all or some of the steps in the embodiments may be implemented by hardware or a program instructing related hardware. The program may be stored in a computer-readable storage medium. The storage medium may be a read-only memory, a magnetic disk, an optical disc, or the like.

In the embodiments of this application, the terms "first", "second", and "third" are merely used for description purposes, but cannot be understood as an indication or implication of relative importance. The term "at least one" means one or more, and the term "a plurality" means two or more, unless expressly limited otherwise.

The term "and/or" in this application describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An interface extension method implemented by a gateway device, wherein the interface extension method comprises:
    receiving interface information from an interface extension device, wherein the interface information comprises a first non-Ethernet interface type and a first media access control (MAC) address of a first non-Ethernet interface of the interface extension device;
    creating, based on the interface information, a first virtual interface on a target Ethernet interface of the gateway device, wherein the first virtual interface corresponds to the first non-Ethernet interface, and wherein a second interface type of the first virtual interface is a second Ethernet interface;

assigning a first Internet Protocol (IP) address to the first virtual interface;

adding a routing entry corresponding to the first virtual interface to a routing table of the gateway device, wherein the routing entry comprises the first IP address of the first virtual interface, the MAC address of the first non-Ethernet interface, and an indication of the first non-Ethernet interface type; and sending an interface creation success notification to the interface extension device.

2. The interface extension method of claim 1, wherein the interface information further comprises a third non-Ethernet interface type and a second MAC address of a second non-Ethernet interface of the interface extension device, wherein the interface extension method further comprises creating, on the target Ethernet interface, a second virtual interface corresponding to the second non-Ethernet interface, and wherein a fourth interface type of the second virtual interface is a third Ethernet interface.

3. The interface extension method of claim 1, wherein after sending the interface creation success notification, the interface extension method further comprises:

receiving a network access notification from the interface extension device, wherein the network access notification comprises an identifier of a to-be-joined network node; and sending an IP address assignment notification to the to-be-joined network node through the interface extension device, wherein the IP address assignment notification comprises a second IP address of the to-be-joined network node, wherein the second IP address and the first IP address belong to a same network segment, wherein a source MAC address of the IP address assignment notification is a second MAC address of the first virtual interface, wherein a destination MAC address of the IP address assignment notification is a third MAC address of the to-be-joined network node, and wherein the second MAC address is the same as the third MAC address.

4. The interface extension method of claim 3, wherein the identifier comprises the third MAC address, and wherein after sending the IP address assignment notification, the interface extension method further comprises adding a neighbor entry corresponding to the to-be-joined network node to a neighbor table of the gateway device.

5. The interface extension method of claim 1, further comprising transmitting information between the gateway device and the interface extension device using an Ethernet frame, wherein the Ethernet frame comprises a target indication field, wherein the target indication field indicates a packet type of the Ethernet frame, wherein the packet type comprises a management packet or a data packet, wherein a first destination device of the management packet is the gateway device or the interface extension device, and wherein a second destination device of the data packet is neither the gateway device nor the interface extension device.

6. The interface extension method of claim 5, wherein the target indication field further indicates a third virtual interface of the gateway device for transmission of the Ethernet frame.

7. An interface extension method implemented by an interface extension device, wherein the interface extension method comprises:

sending interface information to a gateway device, wherein the interface information comprises a first non-Ethernet interface type and a first media access control (MAC) address of a first non-Ethernet interface of the interface extension device, wherein the interface information instructs the gateway device to create, on a target Ethernet interface of the gateway device and based on the interface information, a first virtual interface corresponding to the first non-Ethernet interface, and wherein a second interface type of the first virtual interface is a second Ethernet interface; and receiving an interface creation success notification from the gateway device, wherein the interface creation success notification indicates that the gateway device has completed creation of the first virtual interface and has added a routing entry corresponding to the first virtual interface to a routing table of the gateway device, and wherein the routing entry comprises a first Internet Protocol (IP) address of the first virtual interface, the MAC address of the first non-Ethernet interface, and an indication of the first non-Ethernet interface type.

8. The interface extension method of claim 7, wherein the interface information further comprises a third non-Ethernet interface type and a second MAC address of a second non-Ethernet interface of the interface extension device, wherein the interface information further instructs the gateway device to create, on the target Ethernet interface, a second virtual interface corresponding to the second non-Ethernet interface, and wherein a third interface type of the second virtual interface is a third Ethernet interface.

9. The interface extension method of claim 7, wherein after receiving the interface creation success notification, the interface extension method further comprises:

sending a network access notification to the gateway device after the interface extension device completes layer-2 networking with a to-be-joined network node through the first non-Ethernet interface, wherein the network access notification comprises an identifier of the to-be-joined network node; and receiving a first IP address assignment notification;

converting a frame type of the first IP address assignment notification into a target frame type; and sending a second IP address assignment notification of the target frame type to the to-be-joined network node through the first non-Ethernet interface, wherein the second IP address assignment notification comprises a second IP address of the to-be-joined network node, wherein the target frame type is supported by a network to which the to-be-joined network node belongs, wherein the second IP address and a third IP address of the first virtual interface belong to a same network segment, wherein a source MAC address of the second IP address assignment notification is a second MAC address of the first virtual interface, wherein a destination MAC address of the second IP address assignment notification is a third MAC address of the to-be-joined network node, and wherein the second MAC address is the same as the third MAC address.

10. The interface extension method of claim 7, further comprising transmitting information between the interface extension device and the gateway device using an Ethernet frame, wherein the Ethernet frame comprises a target indication field, wherein the target indication field indicates a packet type of the Ethernet frame, wherein the packet type comprises a management packet or a data packet, wherein a first destination device of the management packet is the gateway device or the interface extension device, and wherein a second destination device of the data packet is neither the gateway device nor the interface extension device.

11. The interface extension method of claim 10, wherein the target indication field further indicates a second virtual interface of the gateway device for transmission of the Ethernet frame.

12. The interface extension method of claim 10, wherein the target indication field comprises a first indication field and a second indication field, wherein the first indication field indicates the packet type, and wherein the second indication field indicates a second virtual interface of the gateway device for transmission of the Ethernet frame.

13. An interface extension apparatus implemented in a gateway device, wherein the interface extension apparatus comprises:
 a memory configured to store instructions; and
 a processor coupled to the memory and configured to execute the instructions to cause the interface extension apparatus to:
  receive interface information from an interface extension device, wherein the gateway device comprises a target Ethernet interface that is coupled to a first Ethernet interface of the interface extension device, and wherein the interface information comprises a first non-Ethernet interface type and a first media access control (MAC) address of a first non-Ethernet interface of the interface extension device;
  create, based on the interface information, a first virtual interface on the target Ethernet interface, wherein the first virtual interface corresponds to the first non-Ethernet interface, and wherein a second interface type of the first virtual interface is a second Ethernet interface;
  assign a first Internet Protocol (IP) address to the first virtual interface;
  add a first routing entry corresponding to the first virtual interface to a routing table of the gateway device, wherein the first routing entry comprises the first IP address of the first virtual interface, the first MAC address of the first non-Ethernet interface, and a first indication of the first non-Ethernet interface type; and
  send an interface creation success notification to the interface extension device.

14. The interface extension apparatus of claim 13, wherein the interface information further comprises a third interface type and a second MAC address of a second non-Ethernet interface of the interface extension device, wherein the instructions further cause the interface extension apparatus to create, on the target Ethernet interface, a second virtual interface corresponding to the second non-Ethernet interface, and wherein a fourth interface type of the second virtual interface is a third Ethernet interface.

15. The interface extension apparatus of claim 13, wherein the instructions further cause the interface extension apparatus to:
 receive a network access notification from the interface extension device, wherein the network access notification comprises an identifier of a to-be-joined network node, and wherein the to-be-joined network node completes layer-2 networking with the interface extension device through the first non-Ethernet interface; and
 send an IP address assignment notification to the to-be-joined network node through the interface extension device,
 wherein the IP address assignment notification comprises a second IP address of the to-be-joined network node,
 wherein the second IP address and the first IP address belong to a same network segment,
 wherein a source MAC address of the IP address assignment notification is a second MAC address of the first virtual interface,
 wherein a destination MAC address of the IP address assignment notification is a third MAC address of the to-be-joined network node, and
 wherein the second MAC address is the same as the third MAC address.

16. The interface extension apparatus of claim 15, wherein the identifier comprises the second MAC address, and wherein the instructions further cause the interface extension apparatus to add a neighbor entry corresponding to the to-be-joined network node to a neighbor table of the gateway device.

17. The interface extension apparatus of claim 13, wherein the instructions further cause the interface extension apparatus to transmit information transmission between the gateway device and the interface extension device using an Ethernet frame, wherein the Ethernet frame comprises a target indication field, wherein the target indication field indicates a packet type of the Ethernet frame, wherein the packet type comprises a management packet or a data packet, wherein a first destination device of the management packet is the gateway device or the interface extension device, and wherein a second destination device of the data packet is neither the gateway device nor the interface extension device.

18. The interface extension apparatus of claim 17, wherein the target indication field further indicates a third virtual interface of the gateway device for transmission of the Ethernet frame.

19. The interface extension apparatus of claim 13, wherein the routing table of the gateway device further comprises a second routing entry and a third routing entry, wherein the second routing entry comprises a second IP address of a second virtual interface, a second MAC address of a second non-Ethernet interface, and a second indication of a second non-Ethernet interface type, and wherein the third routing entry comprises a third IP address of a third virtual interface, a third MAC address of third non-Ethernet interface, and a third indication of a third non-Ethernet interface type.

20. The interface extension apparatus of claim 13, wherein the first non-Ethernet interface type, the second non-Ethernet interface type, and the third non-Ethernet interface type comprise a power line communication interface, a radio frequency interface, and a ZIGBEE interface.

* * * * *